(12) United States Patent
Filipovic et al.

(10) Patent No.: US 8,103,301 B2
(45) Date of Patent: Jan. 24, 2012

(54) DYNAMIC NOISE FLOORS IN A WIRELESS DEVICE

(75) Inventors: Daniel F. Filipovic, Solana Beach, CA (US); Clark Korb, La Mesa, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1153 days.

(21) Appl. No.: 10/412,928

(22) Filed: Apr. 11, 2003

(65) Prior Publication Data

US 2005/0130687 A1    Jun. 16, 2005

Related U.S. Application Data

(63) Continuation-in-part of application No. 10/133,917, filed on Apr. 26, 2002.

(51) Int. Cl.
*H04B 7/00* (2006.01)

(52) U.S. Cl. .......... 455/522; 455/67.11; 455/67.13; 455/423; 455/424; 455/425; 455/501; 370/310.2; 370/328; 342/362; 333/14

(58) Field of Classification Search .......... 455/1, 423, 455/424, 425, 501, 63.1, 65, 67.13, 67.11, 455/114.2, 182.2, 192.2, 232.1, 226.3, 522, 455/234.1, 240.1, 241.1, 247.1, 296; 370/310.2, 370/328; 342/362; 333/16, 14
See application file for complete search history.

(56) References Cited

U.S. PATENT DOCUMENTS

| | | | |
|---|---|---|---|
| 4,112,286 A | | 9/1978 | Alderman et al. |
| 4,225,976 A | * | 9/1980 | Osborne et al. ............ 455/226.3 |
| 4,647,876 A | * | 3/1987 | Waller, Jr. ...................... 333/14 |
| 4,870,370 A | | 9/1989 | Hedberg et al. |
| 5,148,449 A | | 9/1992 | Cannalte et al. |
| 5,222,104 A | | 6/1993 | Medendorp |

(Continued)

FOREIGN PATENT DOCUMENTS

EP        1178630 A1     2/2002

(Continued)

OTHER PUBLICATIONS

Abidi; "Wireless Transceivers in CMOS IC Technology, The New Wave," Electrical Engineering Department, University of California Los Angeles, VSLI and CAD, IEEE1999. 6th International Conference on Seoul, South Korea, pp. 3-10, Oct. 26-27, 1999.

(Continued)

*Primary Examiner* — Steve D Agosta
(74) *Attorney, Agent, or Firm* — Howard H. Seo; Ramin Mobarhan

(57) ABSTRACT

A wireless device configured to support a wireless networking protocol may utilize signal processing techniques that can mitigate the effects of jammer signals. For example, when a measured power associated with a digital sample of a received wireless signal is greater than a threshold, the wireless device may determine if the wireless signal corresponds to a wireless networking packet to be demodulated. If the wireless signal does not correspond to a wireless networking packet to be demodulated, the wireless device may adjust the threshold so that the power associated with the digital sample is less than the threshold. In other words, if the signal is a jammer signal, the wireless device may adjust its noise floor upward so that continuous reception of the same jammer signal does not trigger demodulation a second time.

19 Claims, 5 Drawing Sheets

U.S. PATENT DOCUMENTS

| | | | |
|---|---|---|---|
| 5,307,379 A * | 4/1994 | Bergstrom et al. | 375/317 |
| 5,488,638 A | 1/1996 | Kazecki et al. | |
| 5,682,382 A | 10/1997 | Shepard | |
| 5,722,061 A * | 2/1998 | Hutchison et al. | 455/245.1 |
| 5,732,341 A | 3/1998 | Wheatley, III | |
| 5,734,974 A | 3/1998 | Callaway, Jr. et al. | |
| 5,779,264 A | 7/1998 | De Mersseman et al. | |
| 5,781,845 A | 7/1998 | Dybdal et al. | |
| 5,872,540 A * | 2/1999 | Casabona et al. | 342/362 |
| 5,920,589 A | 7/1999 | Rouquette et al. | |
| 5,940,748 A * | 8/1999 | Daughtry et al. | 455/182.2 |
| 5,956,638 A * | 9/1999 | Chang et al. | 455/423 |
| 5,974,089 A * | 10/1999 | Tripathi et al. | 375/247 |
| 5,974,301 A | 10/1999 | Palmer et al. | |
| 6,052,566 A | 4/2000 | Abramsky et al. | |
| 6,088,382 A | 7/2000 | Maru | |
| 6,097,707 A * | 8/2000 | Hodzic et al. | 370/321 |
| 6,127,965 A * | 10/2000 | McDade et al. | 342/159 |
| 6,134,430 A * | 10/2000 | Younis et al. | 455/340 |
| 6,151,312 A | 11/2000 | Evans et al. | |
| 6,166,690 A * | 12/2000 | Lin et al. | 342/383 |
| 6,310,865 B1 * | 10/2001 | Ohki | 370/311 |
| 6,377,782 B1 | 4/2002 | Bishop et al. | |
| 6,438,363 B1 | 8/2002 | Feder et al. | |
| 6,472,935 B2 | 10/2002 | King et al. | |
| 6,477,404 B1 * | 11/2002 | Yonce et al. | 600/510 |
| 6,498,927 B2 * | 12/2002 | Kang et al. | 455/245.2 |
| 6,565,559 B2 | 5/2003 | Eggleston | |
| 6,628,732 B1 | 9/2003 | Takaki | |
| 6,748,200 B1 | 6/2004 | Webster et al. | |
| 6,760,320 B1 | 7/2004 | Bune | |
| 6,775,336 B1 | 8/2004 | Takaki | |
| 6,785,523 B2 | 8/2004 | Husted et al. | |
| 6,798,754 B1 | 9/2004 | Farhang-Boroujeny | |
| 6,836,519 B1 | 12/2004 | Gerlach et al. | |
| 6,879,644 B1 * | 4/2005 | Jeffress | 375/317 |
| 6,888,879 B1 | 5/2005 | Lennen | |
| 6,904,274 B2 | 6/2005 | Simmons et al. | |
| 6,947,445 B1 | 9/2005 | Barnhart | |
| 6,952,591 B2 | 10/2005 | Budka et al. | |
| 6,978,937 B2 | 12/2005 | Iwaguchi et al. | |
| 7,003,057 B2 | 2/2006 | Hasegawa | |
| 7,024,169 B2 | 4/2006 | Ciccarelli et al. | |
| 7,035,285 B2 | 4/2006 | Holloway et al. | |
| 7,103,112 B2 | 9/2006 | Webster et al. | |
| 7,305,259 B1 | 12/2007 | Malone et al. | |
| 2002/0186796 A1 | 12/2002 | McFarland et al. | |

FOREIGN PATENT DOCUMENTS

| | | |
|---|---|---|
| WO | WO0147128 A1 | 6/2001 |
| WO | WO03092178 | 11/2003 |

OTHER PUBLICATIONS

Frederick J. Hill et al., "Computer Aided Logical Design with Emphasis on VLSI," Publisher John Wiley & Sons, Inc. 4th edition, p. 10, ISBN: 0-471-57527-5, year of publication 1993.

International Search Report—PCT/US2003/012936, International Searching Authority—European Patent Office—Aug. 11, 2003.

* cited by examiner

DYNAMIC NOISE FLOORS IN A WIRELESS DEVICE

This application is a continuation-in-part (CIP) of U.S. application Ser. No. 10/133,917, filed Apr. 26, 2002.

FIELD

This disclosure relates to wireless communication and, more particularly, to wireless networking.

BACKGROUND

Wireless networking allows wireless devices to share information and resources via wireless communication. Examples of wireless devices used in wireless networks include laptop or desktop computers, personal digital assistants (PDAs), mobile phones, data terminals, data collection devices, household appliances, and other portable and non-portable wireless computing devices. Many devices that support wireless networking standards may also support other communication standards, such as standards commonly used for voice communications.

One family of standards developed to facilitate wireless networking is set forth in the IEEE 802.11 standards. The original IEEE 802.11 standard provides wireless data transfer rates of 1-2 Megabits per second (Mbps) in a 2.4-2.483 Gigahertz (GHz) frequency band (hereafter the 2.4 GHz band). However, a number of extensions to the original IEEE 802.11 standard have been developed in an effort to increase wireless data transfer rates.

The IEEE 802.11b standard (sometimes referred to as 802.11 wireless fidelity or 802.11 Wi-Fi) provides 11 Mbps transmission, with a fallback to 5.5, 2.0 and 1.0 Mbps in the 2.4 GHz band. The IEEE 802.11g standard is another extension of the IEEE 802.11 standard. The IEEE 802.11g standard utilizes orthogonal frequency division multiplexing (OFDM) in the 2.4 GHz frequency band to provide data transmission at rates up to 54 Mbps. The IEEE 802.11g standard also provides backwards capability with 802.11b networks. The IEEE 802.11a standard is an extension of IEEE 802.11 standard that utilizes OFDM in a 5 GHz frequency band to provide data transmission at rates up to 54 Mbps. Other wireless networking protocols include "Bluetooth protocols" developed by the Bluetooth Special Interest Group. Additional extensions to the IEEE 802.11 standard, as well as other wireless local area network (WLAN) standards will likely emerge in the future.

One challenge in wireless networking involves dealing with "jammer signals." Jammer signals generally refer to noise signals received by a wireless device that do not correspond to data packets supported by the device. Jammer signals may be caused by signals sent from other devices operating according to protocols not supported by the wireless device, signals emitted from microwave ovens, cordless telephones, or any other devices that emit electromagnetic radiation. In many wireless networking standards, the operating frequencies are unregulated, and thus, the presence of jammer signals in the operating frequencies are likewise unregulated.

SUMMARY

In general, this disclosure describes techniques capable of mitigating the effects of jammer signals received by a wireless device. Jammer signals generally refer to noise signals received by a wireless device that do not correspond to data packets supported by the device. By reducing the likelihood that the same jammer signal will be demodulated by the wireless device a number of different times, performance of the wireless device can be improved. The techniques described herein may be used with wireless networking protocols such as one or more of the IEEE 802.11 protocols, or the like.

In one embodiment, this disclosure provides a method comprising receiving a wireless signal, and determining if the wireless signal corresponds to a wireless networking packet to be demodulated when a measured power associated with the wireless signal is greater than a threshold. The method may further comprise adjusting the threshold so that the power associated with the wireless signal is less than the threshold if the wireless signal does not correspond to a wireless networking packet to be demodulated. In other words, if the signal is a jammer signal, the wireless device may adjust its noise floor upward so that continuous reception of the same jammer signal does not trigger another demodulation.

Various embodiments may be implemented in software, hardware, firmware, or various combinations of hardware, software or firmware. Additional details of various embodiments are set forth in the accompanying drawings and the description below. Other features, objects and advantages will become apparent from the description and drawings, and from the claims.

DETAILED DESCRIPTION

This disclosure describes a wireless device configured to perform certain signal processing tasks associated with wireless networking. More specifically, a wireless device configured to support a wireless networking protocol may utilize signal processing techniques that can mitigate the effects of jammer signals. Jammer signals refer to noise signals received by a wireless device that do not correspond to data packets supported by the wireless networking protocol. Jammer signals may comprise signals sent from other devices operating according to protocols not supported by the wireless device, signals emitted from microwave ovens, cordless telephones, or other devices that emit electromagnetic radiation.

For example, when a measured power associated with a digital sample of a received wireless signal is greater than a threshold value, the wireless device may determine if the wireless signal corresponds to a wireless networking packet to be demodulated. If the wireless signal does not correspond to a wireless networking packet to be demodulated, the wireless device may adjust the threshold so that the power associated with the digital sample is less than the threshold. In other words, if the signal is a jammer signal, the wireless device may adjust its noise floor upward so that continuous reception of the same jammer signal does not trigger demodulation a second time.

Once the jammer signal is no longer present, the noise floor can be readjusted to reflect this fact, i.e., the threshold(s) can be reset. In some embodiments, the adjustments to the noise floor may occur with each signal processing cycle, i.e., with each digital sample of the signal. Moreover, the adjustments may take place only when processing is occurring in certain discrete gain states of the wireless device, e.g., gain states other than the first gain state that has maximum sensitivity. In this manner, performance of a wireless device that operates according to a wireless networking protocol can be improved.

Figure 1:
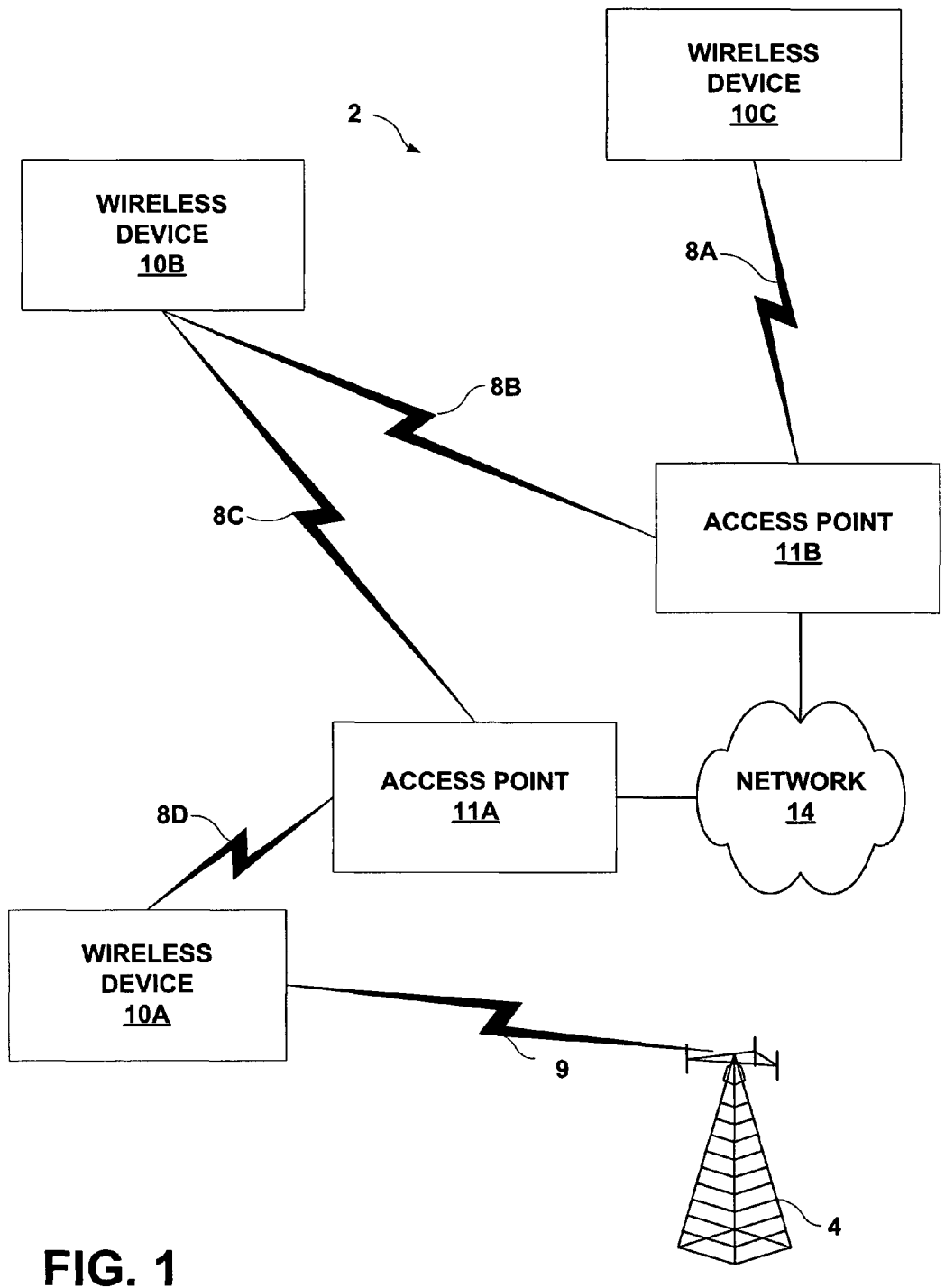
FIG. 1 is a block diagram illustrating a wireless communication system in which wireless devices can implement one or more of the techniques described herein.

FIG. 1 is a block diagram illustrating a wireless communication system 2 including a number of wireless devices 10A-10C, collectively referred to as wireless devices 10. Wireless devices 10 may be any portable computing device configured to support wireless networking. Each device may be, for example, a desktop or portable computer operating in a Windows™, Macintosh™, Unix, or Linux environment, a personal digital assistant (PDA) based on the Palm™, Windows CE, or similar operating system environments for small portable devices, or other wireless device such as a mobile radiotelephone, an interactive television, a wireless data terminal, a wireless data collection device, an Internet kiosk, a network-ready appliance for the home environment, a wireless server, or the like.

Wireless devices 10 communicate with one another in wireless communication system 2 via wireless signals 8A-8D (hereafter wireless signals 8). In particular, wireless devices 10 may communicate according to a wireless protocol such as the protocol defined by a wireless networking standard, e.g., one of the standards in the IEEE 802.11 family of standards. Wireless signals 8 may be sent to and from the respective wireless devices 10 by wireless access points 11A and 11B. The access points 11 may have wired connections to a network 14, such as a local area network, a wide area network, or a global network such as the Internet.

In addition to supporting wireless networking standards, one or more wireless devices 10 within system 2 may also be configured to support one or more voice communication standards. For example, one or more base stations 4 may communicate voice data 9 to wireless device 10A via voice communication techniques such as code division multiple access (CDMA) techniques, frequency division multiple access (FDMA) techniques, time division multiple access (TDMA) techniques, various combined techniques, or the like.

As described in greater detail below, wireless devices 10 may be configured to dynamically adjust noise floors in order to improve signal reception in the presence of jammer signals. In particular, power detectors may implement dynamic thresholds for wireless signal detection. For example, when a measured power associated with a digital sample of the wireless signal is greater than a threshold, wireless devices 10 may determine if the wireless signal corresponds to a wireless networking packet to be demodulated, e.g., by enabling demodulation components and performing a peak detection search on the signal. If the wireless signal does not correspond to a wireless networking packet to be demodulated, the wireless devices 10 may adjust the threshold so that the power associated with the sample of the wireless signal is less than the threshold. In this manner, performance of wireless devices 10 that operates according to one or more wireless networking protocols can be improved. In particular, the same jammer signal should not cause the demodulation components to be enabled after the threshold has been adjusted because the adjusted threshold may compensate for the presence of that jammer signal. In other words, with a dynamic power detection threshold, wireless device 10 can selectively avoid demodulation of jammer signals, resulting in power savings and reduction in computational overhead.

In the examples that follow, many details will be provided in the context of a wireless device 10 that operates according to discrete gain states. The implementation of discrete gain states may improve and/or simplify wireless devices 10 by avoiding the need for analog closed-loop automatic gain control. In one example, the gain state selection process may involve processing a received signal according to a first. gain state, detecting whether the gain state is too large, possibly reducing the gain state, detecting whether the reduced gain state is too large, possibly reducing the gain state again, and so forth. Accordingly, the gain state selection process may involve a series of incremental decreases (or increases), i.e., from gain state to gain state, until an appropriate gain state has been selected. Dynamic adjustments to the noise floor may only occur in some of the gain states, although this disclosure is not limited in that respect. In any case, the gain state selection process may be performed within the time allocated by wireless networking standards, and the noise floor adjustments, i.e., adjustments to the threshold(s), may occur to mitigate problems associated with jammer signals.

Figure 2:
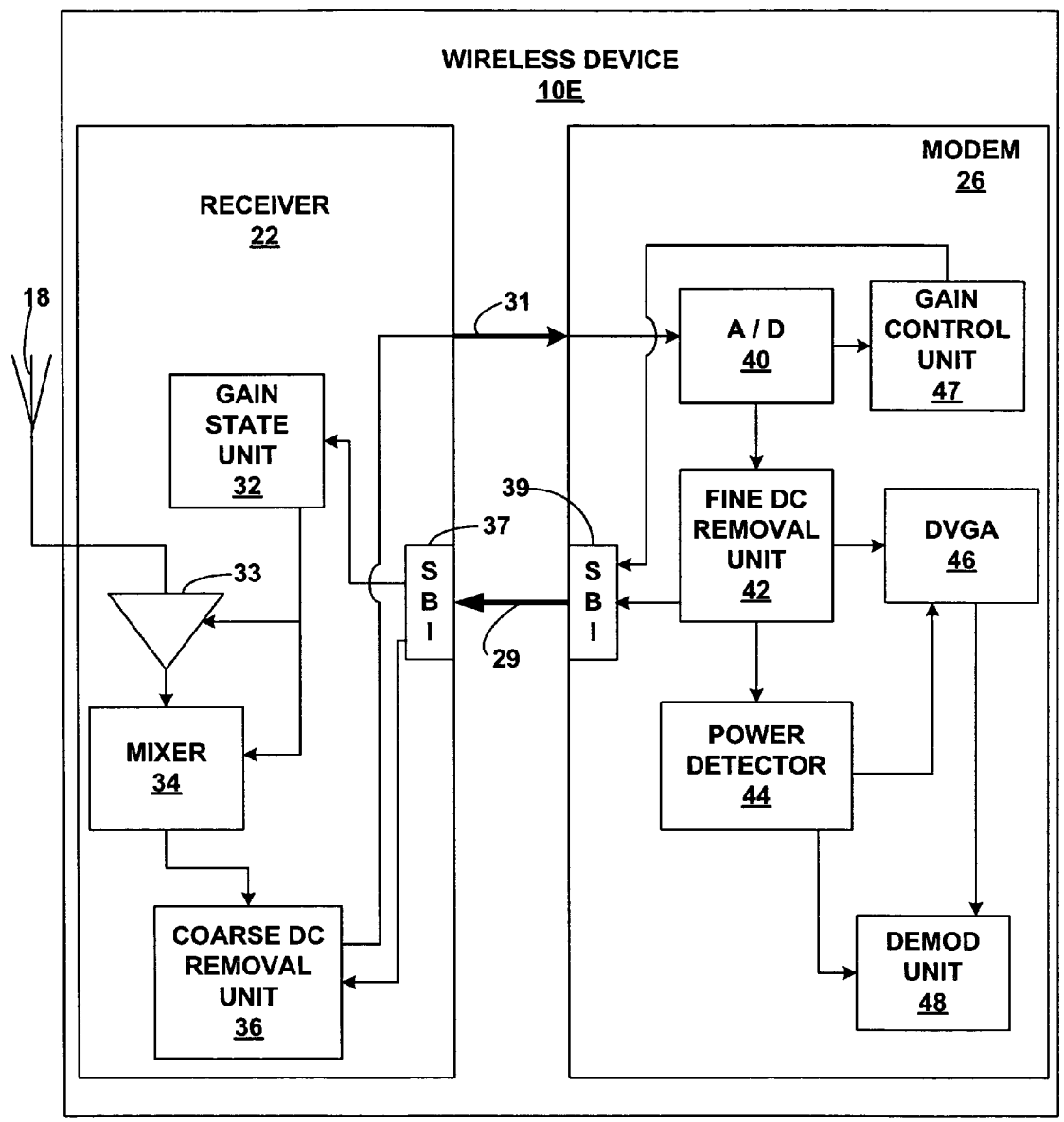
FIG. 2 is a block diagram of an exemplary wireless device depicted in FIG. 1.

FIG. 2 is a block diagram illustrating one implementation of a wireless device 10E. Wireless device 10E includes a receiver 22 coupled to a (modulator/demodulator) modem 26. Receiver 22 generally performs signal processing of a received analog signal, whereas modem 26 generally performs signal processing of digital values generated from a baseband analog signal. Modem 26 refers to a structure or collection of structures that perform modulation, demodulation, or both. In particular, modem 26 may form a digital control unit, and may be implemented as one or more dedicated processors, a DSP executing software, or the like. A/D converter 40 is illustrated as forming part of modem 26, but could alternatively be formed as part of receiver 22, or as a separate component.

Wireless signals are received by receiver 22 via antenna 18. As shown, receiver 22 may include a gain state unit 32 that stores the selected gain state for processing of a received signal. Gain state unit 32, for example, may be programmed or commanded to default to the highest gain state in order to ensure that the lowest power signals can be detected and processed. Modem 26 identifies when the gain state is too large, and in that case, sends one or more commands to gain state unit 32 to cause gain state unit 32 to reduce the gain state. In general, the selected gain state discretely defines the gain of one or more amplifiers 33, mixers 34, or other components within receiver 22. The implementation of discrete gain states can simplify and improve wireless device 10E by avoiding the need for continuous analog closed-loop automatic gain control.

Amplifier 33 scales a received RF signal according to the current gain state and provides the scaled signal to mixer 34. Mixer 34 receives the RF signal from amplifier 33 and mixes it down to baseband (sometimes referred to as the downconversion process). For demodulation used in IEEE 802.11b wireless networks, for example, mixer 34 generates baseband signals for I- and Q-components of the RF signal as is well known in the art. The I-component refers to the in-phase component of the complex waveform, whereas the Q-component refers to the quadrature-phase component of the complex waveform. In both cases, mixer 34 passes the baseband signal for the respective I- or Q-components of the complex waveform to coarse DC removal unit 36.

For example, mixer 34 may implement a frequency synthesizer that utilizes a local oscillator (LO) of wireless device 10E as a timing reference. Thus, mixer 34 may remove the RF carrier component of the received RF signal to generate the baseband signals associated with a received wireless networking packet. As desired, receiver 22 may also include additional components such as various filters, and the like.

Coarse DC removal unit 36 stores values indicative of an estimated. DC offset associated with the received baseband signal. For this reason, coarse DC removal unit 36 can quickly remove DC from the baseband signal associated with the received packet within the time constraints imposed by wireless networking standards. In particular, coarse DC removal unit 36 may store DC offset values associated with each of the gain states. In that case, coarse DC removal unit 36 may select the appropriate DC offset value according to the current gain state identified by gain state unit 32 in order to remove the appropriate amount of DC from the analog baseband signal.

After coarse DC removal unit 36 has removed a DC offset in the baseband signals, the baseband signals can be sent to modem 26 for demodulation. For example, the baseband signals can be sent from receiver 22 to modem 26 via analog transmission line 31. Receiver 22 and modem 26 may also be coupled together by a serial bus 29. Accordingly, receiver 22 and modem 26 may each include a serial bus interface 37, 39 to facilitate data transmission over serial bus 29.

Upon receiving the I- and Q-baseband signals, modem 26 converts the signals to a digital representation (referred to as a digital baseband signal). In particular, analog-to-digital (A/D) converter 40 samples a received analog baseband signal and produces the corresponding digital baseband signal in the form of 10-bit digital samples, although larger or smaller A/D converters could also be used to generate the digital baseband signal in the form of larger or smaller samples. In other words, AID converter 40 may have any desired dynamic range. In any case, A/D converter 40 forwards the samples to gain control unit 47 and fine DC removal unit 42. In other implementations, A/D converter 40 may form part of receiver 22 or may be a unit separate from receiver 22 and modem 26.

Gain control unit 47 may perform gain state selection based on the output of A/D converter 40. Gain control unit 47 may receive the digital samples directly from A/D converter 40, and select a gain state based on the digital samples. Alternatively, gain control unit 47 may receive digital values from a digital filter (not shown) that filters the output of A/D converter 40 specifically for gain state selection purposes. In any case, the output of A/D converter 40 (direct output or a digitally filtered output) can be used by gain control unit 47 to select a gain state. Alternatively, power detector 44 may be used to define the gain state and send control signals to gain state unit 32.

In the illustrated example, if the output of A/D converter 40 (direct or filtered) is at or greater than an upper gain state threshold, then gain control unit 47 may select a different gain state to reduce gain values stored in gain state unit 32 and thereby reduce gains of amplifier 33 and/or mixer 34. Similarly, if the output of A/D converter 40 is at or below a lower gain state threshold, then gain control unit 47 may select a different gain state to increase gains stored in gain state unit 32. Adjustments to the gain states may be communicated from gain control unit 47 to gain state unit 32 via serial bus 29.

In one example, the upper gain state threshold utilized by gain control unit 37 may correspond to the saturation point of A/D converter 40. In that case, gain state switching to cause gain reductions in amplifier 33 and/or mixer 34 would occur when A/D converter 40 is at or near saturation. In other cases, the upper gain state threshold may be selected to correspond to a point below saturation of A/D converter 40 which may further help wireless device 10E deal with jammer signals.

Fine DC removal unit 42 also receives output of A/D converter 40 and implements a DC removal loop to remove residual DC from the digital baseband signal. In addition, fine DC removal unit 42 may include a coarse DC estimator to estimate the residual DC offset associated with the baseband signal at the current gain state, and update coarse DC removal unit 36 via serial bus 29 so that subsequently received packets processed at that gain state have more appropriate DC removed by coarse DC removal unit 36. After removing the residual DC from the digital baseband signal, fine DC removal unit 42 may forward the digital baseband signals to power detector 44 and a digital variable gain amplifier (DVGA) 46.

Power detector 44 may include a plurality of power detection modules that respectively perform power detection according to different algorithms. In particular, a high power detection module may perform power detection according to a first algorithm in order to quickly identify whether a high power signal is present, and a low power module may perform power detection according to a second algorithm in order to identify whether a low power signal is present.

If power detector 44 detects a signal, it may enable demodulation components such as DVGA 46 and demodulation unit 48 so that demodulation of a wireless networking packet can occur. In other words, demodulation components such as DVGA 46 and demodulation unit 48 may be disabled for purposes of power conservation until power detector 44 detects a signal that could likely be a wireless networking packet supported by wireless device 10E.

Power detector 44 may implement one or more dynamic thresholds that automatically adjust in the presence of jammer signals. In particular, following enabling of DVGA 46 and demodulation unit 48, if a peak detection search on the signal fails, power detector 44 may assume that the signal is not a wireless networking packet that requires demodulation. If demodulation components of modem 26 determine that a signal is not a wireless networking packet, thresholds of power detector 44 can be automatically adjusted upward so that subsequent signals at the same power level do not cause the demodulation components to be invoked. In that case, the signal may be a jammer signal. Accordingly, power detector 44 can adjust its thresholds so that the same jammer signal does not cause additional demodulation cycles in the case the jammer signal is being continuously received. Such avoidance of demodulation of jammer signals can conserve power and also allows the wireless device to respond to wireless packets at higher power levels than the jammer, since the wireless device does not constantly reset after continuously determining that the signal is not a wireless packet.

As mentioned, power detector 44 may implement low power and high power detection modules, although similar techniques may be implemented even if a single power detection module is implemented. The low power detection module may be a slower, more precise detection module than the high power detection module. The additional precision of the low power detection module can improve power detection specifically for low power signals in order to better ensure that packets received at lower power are not missed by wireless device 10E.

In some embodiments, control signals for adjusting gain state unit 32 may be sent from an alternative gain control unit that operates with power detector 44, rather than gain state unit 47 that receives direct output from A/D converter 40. In that case, the use of dual power detectors may allow the faster high power detector to quickly detect power levels that would invoke gain state changes, while the slower low power detector could be more precise since gain state reductions would not be needed if the signal is detected only by the low power detector. Also, in that case, multiple thresholds may be used by the high power detector, e.g., one to invoke gain state changes and another that does invoke a gain state change but indicates the presence of a high power signal in the current gain state.

In some implementations, wireless device 10E may incorporate multiple antennas. In that case, the output of power detector 44 or gain control unit 47 may also be used to select an antenna in order to improve signal reception. For example, a different antenna may be selected depending on the power level of the received signal as indicated by the output of A/D converter 40 or the output of power detector 44. In some cases, different antennas may be selected depending on whether the high power detection module or the low power detection module within power detector 44 issues a power detection indicator. In other cases, different antennas may be selected based on the applicable gain state.

Once enabled by power detector 44, DVGA 46 can be used to scale the digital baseband signal, either by amplifying or attenuating the digital samples. In particular, DVGA 46 may perform residual gain adjustments to the digital baseband signal. After scaling the digital baseband signal, DVGA 46 then forwards the scaled digital baseband signal to demodulation unit 48 for demodulation. Demodulation unit 48 may perform a peak detection search to identify whether the signal is a wireless networking packet supported by wireless device 10E and to ensure that the signal has sufficient strength to allow for effective demodulation. For example, in an IEEE 802.11 context, the peak detection may comprise correlating an incoming data stream to a known Barker sequence, and comparing the correlation result to a predefined threshold. If the peak detection fails, demodulation unit 48 may be disabled, and the thresholds in power detector 44 remain adjusted according to the previous signal strength of the jammer signal. On the other hand, if the peak detection indicates that the signal is a wireless networking packet with sufficient strength, demodulation unit 48 proceeds to demodulate the packet, and thresholds in power detector 44 can be reset following such demodulation.

Figure 3:
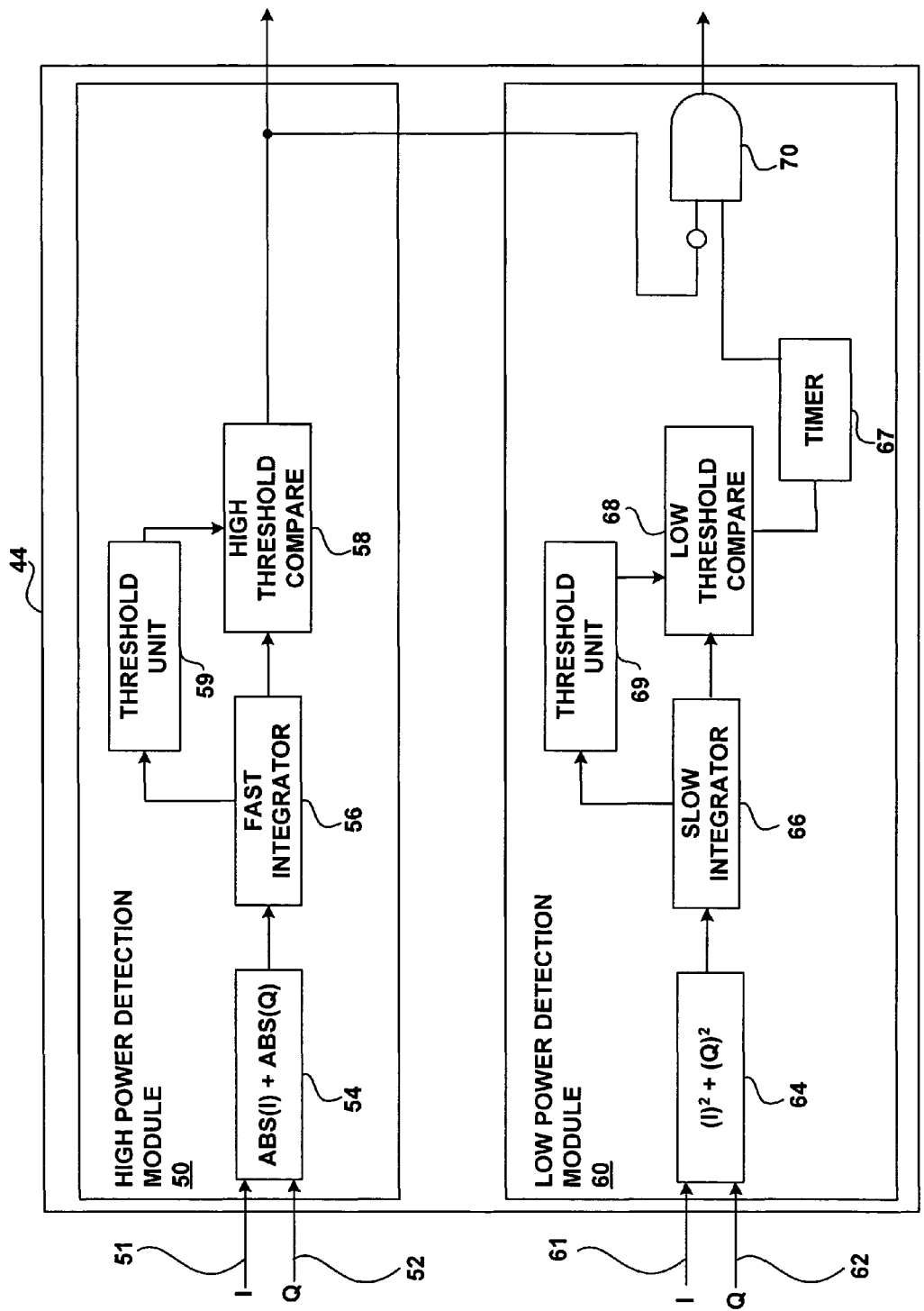
FIG. 3 is a block diagram of an exemplary power detector that implements dynamic thresholds that adjust in the presence of jammer signals.

FIG. 3 is a more detailed block diagram of an exemplary implementation of power detector 44. As illustrated, power detector 44 implements a plurality of power detection modules 50, 60. In the illustrated example, two power detection modules are implemented, although this disclosure is not limited in that respect. In other words, for some wireless networking standards, such as standards not yet developed, additional power detection modules may also be useful. Also, a single power detection module could also implement dynamically adjusting thresholds as described herein.

In the illustrated example of FIG. 3, power detector 44 includes a high power detection module 50 and a low power detection module 60. I- and Q-baseband samples are received from fine DC removal unit 42 at inputs 51, 52, 61, and 62, e.g., in accordance with the 802.11b standard. In one implementation, only a subset of least significant bits (LSB) may be received by low power detection module 60 at inputs 61 and 62. Lower power signals will generally have zero values for the most significant bits. Thus, by providing only some of the least significant bits at inputs 61 and 62, components of low power detection module 60 can be simplified.

In high power detection module 50, a power estimator 54 estimates the power contained in the I- and Q-baseband components at inputs 51 and 52 using one technique, e.g., the sum of the magnitudes of the I- and Q-baseband components. This sum is provided to a fast integrator 56 which may implement an infinite impulse response (IIR) filter having a tap weight value of, for example, 0.75. Fast integrator 56 integrates over a smaller effective window than slow integrator 66 in low power detection module 50. However, the actual speed of the integrators may vary according to implementation.

By way of example, fast integrator 56 may integrate the baseband samples over a sliding effective window of 8 samples, or more or less samples by changing the tap weight value if desired. By integrating over a relatively small window, fast integrator 56 can generate an power estimates very quickly. Fewer samples result in less accuracy, but more samples take a longer time to integrate. For example, the integration time of 2 samples received at a rate of 22 MHz may be approximately 0.09 μsec., the integration time of 4 samples received at a rate of 22 MHz may be 0.18 μsec., the integration time of 8 samples received at a rate of 22 MHz may be 0.36 μsec., and so forth.

Low power detection module 60 operates in parallel with high power detection module 50 in order to detect low power signals. Low power detection module 60 may operate more slowly and at a higher accuracy than high power detector 50. Therefore, low power detection module 60 may integrate over a much larger effective window than high power detection module 60 when calculating the power estimates, hence the term slow integrator 66. It should be noted, however, that the terms slow integrator 66 and fast integrator 56 are relative terms that describe the size of the sliding window of the integrators relative to one another. The actual speed of the integration may vary widely for different implementations.

In low power detection module 60, a power estimator 64 estimates the power contained in the I- and Q-baseband components at inputs 61 and 62 using a different technique than high power detection module 50, e.g., the sum of the squares of the I- and Q-baseband components. In some cases, however, the same summing technique can be used for different power detection modules that integrate over different sliding windows. In the illustrated example, the sum of the squares is provided to a slow integrator 66, which may implement an infinite impulse response (IIR) filter having a tap weight value of, for example, 0.9921875 or 0.984375. Slow integrator 66 integrates over a larger integration time, i.e., a larger effective window, than the fast integrator 56 in high power detection module 50. As mentioned above, however, the actual speed of the integrators may vary according to implementation.

By way of example, slow integrator 66 may integrate the baseband samples over a window of 128 samples, 256 samples, or a smaller or larger amount of samples by changing the tap weight value if desired. By integrating over a relatively large effective window, slow integrator 66 can generate power estimates that are very accurate. For example, the integration time of 64 samples received at a rate of 22 MHz may be approximately 2.9 μsec., the integration time of 128 samples received at a rate of 22 MHz may be 5.8 μsec., the integration time of 256 samples received at a rate of 22 MHz may be 11.6 μsec., the integration time of 512 samples received at a rate of 22 MHz may be 23.3 μsec., and so forth.

Logic may be coupled to the first and second power detection modules in order to ensure that a second power indicator will not be generated in the event that a first power indicator is generated. For example, timer unit 67 may be added to low power detection module 60 in order to ensure that a low power indicator is never generated before a high power indicator. AND gate 70 with an inverting input coming from the output of high threshold compare unit 58 may be used to ensure that a low power indicator is never generated in the event that a high power indicator is generated. In other words, timer unit

67 may add a delay to allow power detection module 60 to verify that high threshold compare unit 58 did not generate the high power indicator. Then, AND gate 70 generates the low power indicator only if low power threshold compare unit 68 determines that the average estimated power exceeds the programmed low threshold and high power threshold compare unit 58 determines that the average estimated power does not exceed the programmed high threshold. Accordingly, if the high power indicator is generated, the low power indicator will not also be generated. Also, if power detector 44 is used to invoke gain state changes, high power detector 50 may include multiple threshold compare units, e.g., one unit using gain state threshold to determine if gain state changes should occur, and another using a different threshold to determine if a signal is present in the current gain state.

The power estimates of each digital sample sent to integrators 56, 66 may be compared to thresholds respectively by high threshold compare unit 58 and low threshold compare unit 68 in order to determine whether a signal is present, which should be demodulated. As mentioned above, however, sometimes jammer signals can cause the received power to exceed one of the thresholds. For this reason, high power detection module 50 and low power detection module each implement a threshold unit 59, 69 in order to dynamically adjust or control the thresholds used by compare units 58, 68 for the purpose of identifying packets to be demodulated.

Threshold units 59, 69 receive the average power measurements from integrators 56, 66, and generate upper and lower thresholds relative to the average power estimates. In one implementation, the individual values of received samples are used by threshold units 59, 69 until four samples have been received and integrated by integrators 56, 66, and then the average power is defined by threshold units 59, 69 for a sliding window of four samples. Then, once integrators 56, 66 have received eight samples, threshold units 59, 69 may define the average power using a sliding window of eight samples. In that case, the upper and lower thresholds may also change such that the thresholds are closer to the average value when more samples are available. In other words, if one sample is used to define the thresholds, threshold units 59, 69 may define the thresholds as being +/−X of the sample. If four samples are available and used to define the thresholds, threshold units 59, 69 may define the thresholds as being +/−Y of the average, where Y is less than X. Similarly, if eight samples are available and used to define the thresholds, threshold units 59, 69 may define the thresholds as being +/−Z of the average, where Z is less than Y. With low power detector 60, even larger numbers of samples may be used to define the average values, as more numbers of samples are available.

In any case, by adjusting the thresholds based on the power of received signals, the same jammer signal should not cause demodulation a number of times. If a wireless packet is identified and demodulated, the thresholds can be reset. However, if a jammer signal causes a demodulation to begin, e.g., a peak detection search, the thresholds will remain in effect and be adjusted by the strength of the jammer signal. Accordingly, the likelihood that the same jammer will cause another demodulation to occur can be significantly reduced because the first occurrence of the jammer will cause the threshold to increase. Moreover, if the threshold is adjusted because of the presence of a jammer signal, a wireless networking packet may still be received and demodulated if it has sufficient power above the jammer signal.

Once the power of a sample of the received signal falls below the lower threshold, the thresholds may be reset, e.g., because when the power of a sample of the received signal falls below the lower thresholds, it is highly likely that any jammer signals that were present are no longer present. Accordingly, resetting the thresholds when the power of a sample of the received signal falls below the lower threshold can improve responsiveness to the disappearance of jammer signals. For example, resetting the thresholds may even allow for relatively low power 802.11b packets to be received and demodulated between the occurrence of successive relatively high power Bluetooth packets, which would be jammer signals to a device that only supported 802.11b.

Figure 4:
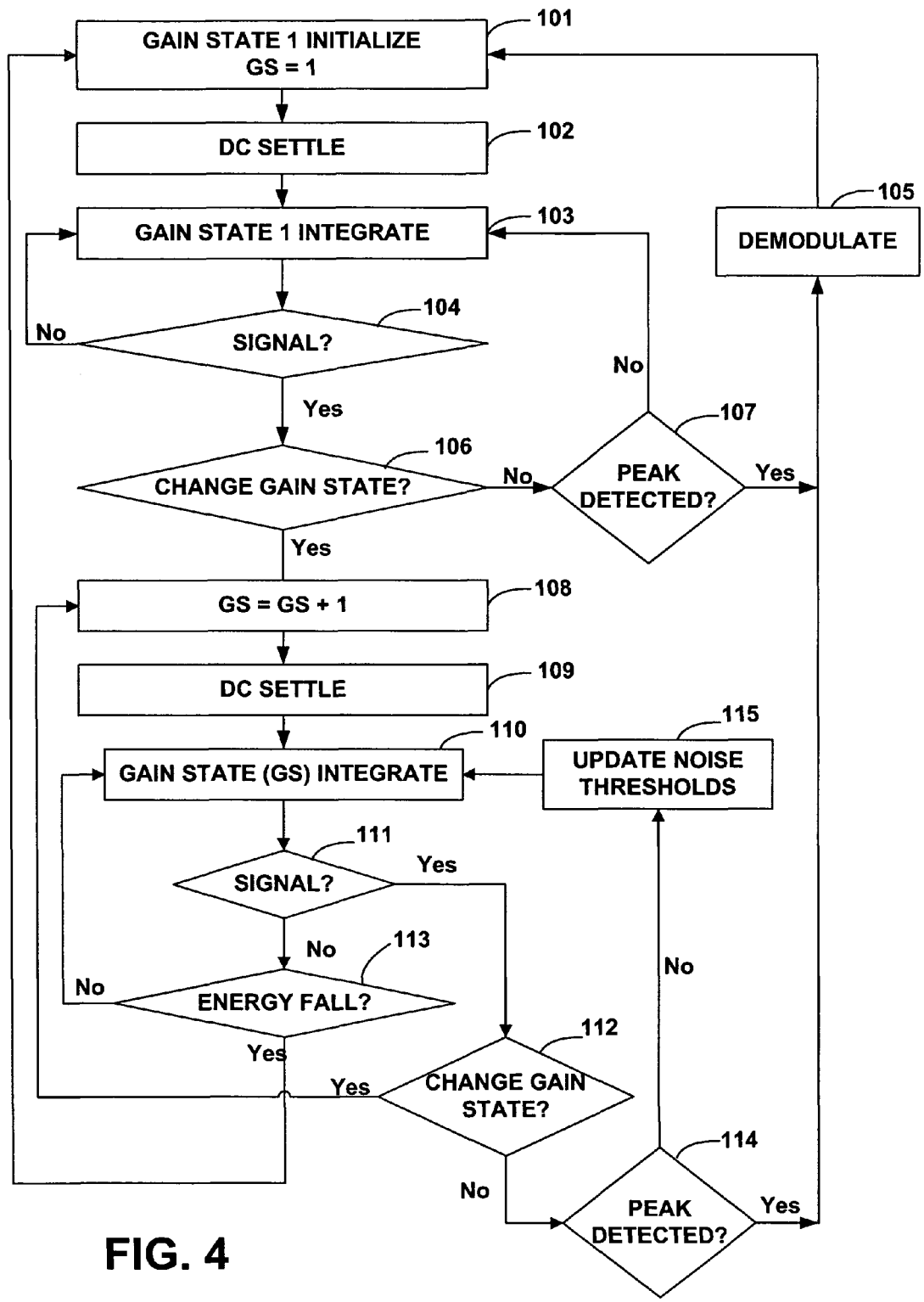
FIGS. 4 and 5 are flow diagrams illustrating signal processing techniques that can mitigate the effects of jammer signals in a wireless networking environment.

FIG. 4 is a flow diagram illustrating a signal processing technique that may be implemented by one or more of wireless devices 10 (FIG. 1) such as wireless device 10E (FIG. 2). The technique may be executed substantially by logic circuits of modem 26, various block components of modem 26 as illustrated in FIG. 2, or possibly a relatively complex state machine that controls and coordinates the performance of modem 26.

As shown in FIG. 4, wireless device 10E is initialized in gain state 1 (101), which may define the highest gains, i.e., the most sensitivity. Gain state unit 32 stores the gain state and provides gain control signals to mixer 34 and coarse DC removal unit 36 consistent with the current gain state. Wireless device 10E then performs DC settling (102) within the time constraints imposed by the wireless networking protocol. In particular, coarse DC removal unit 36 may select the appropriate DC offset value according to the current gain state identified by gain state unit 32 in order to remove the appropriate amount of DC from the baseband signal. Fine DC removal unit 42 also receives output of A/D converter 40 and implements a DC removal loop to remove residual DC from the digital baseband signal. In addition, fine DC removal unit 42 may estimate the residual DC offset associated with the baseband signal at the current gain state, and update coarse DC removal unit 36 via serial bus 29 so that subsequently received packets processed at that gain state have more appropriate DC removed by coarse DC removal unit 36. After removing the residual DC from the digital baseband signal, fine DC removal unit 42 may forward the digital baseband signals to power detector 44 and a digital voltage gain amplifier (DVGA) 46.

Power detector 44 integrates in gain state 1 (103) and performs power detection as described herein in order to determine if a wireless networking signal has been received (104), e.g., by comparing digital samples to thresholds. If the power of a sample is greater than a threshold then a signal is present (yes branch of 104). If a gain state change is not invoked at this point (no branch of 106), then power detector 44 causes demodulation components such as DVGA 46 and demodulation unit 48 to be enabled for peak detection on the signal (107). If peak detection is successful (yes branch of 107), indicating that a wireless networking packet was received, demodulation unit 48 demodulates the signal (105), and wireless device 10E returns to gain state 1 (101). If peak detection fails at this point (no branch of 107), wireless device 10E continues integrating in gain state 1 (103). In this exemplary embodiment of FIG. 4, adjustments to the thresholds may be avoided in gain state 1 since gain state 1 represents the most sensitive gain state. In other embodiments, however, adjustments to the thresholds, as outlined in greater detail below with reference to gain state 2 and gain state 3, may also occur in gain state 1.

During integration in gain state 1 (103) and signal detection (104), if wireless device 10E determines that a gain state change is necessary (yes branch of 106), wireless device 10E changes the gain state (108). In particular, wireless device 10E may change from gain state 1, which has the highest gains, to gain state 2 which has reduced gains relative to gain state 1. In order to make such gain state decisions, wireless device 10E may implement a gain state control unit 47 that makes gain state decisions based on the output of A/D converter 40, e.g., reducing gain if A/D converter 40 is saturated. Alternatively, gain state decisions may be made by a gain state unit that operates with power detector 44 rather than gain state unit 47 that receives direct output from A/D converter 40. In that case, the use of dual power detectors may allow the faster high power detector 50 to quickly detect power levels that would invoke gain state changes, while the slower low power detector 60 could be more precise since gain state reductions would not be needed if the signal is detected only by low power detector 60. Also, in that case, multiple threshold units may be used by high power detector 50, e.g., one to invoke gain state changes and another not to invoke a gain state change but to indicate presence of a high power signal in the current gain state.

Following a gain state change (108), wireless device 10E performs DC settling again (109). In particular, coarse DC removal unit 36 selects the appropriate DC offset value according to the new gain state, and fine DC removal unit 42 implements a DC removal loop to remove residual DC from the digital baseband signal. In addition, fine DC removal unit 42 estimates the residual DC offset associated with the baseband signal at the new gain state, and updates coarse DC removal unit 36.

Power detector 44 integrates in gain state 2 (110) and performs power detection as described herein in order to determine if a wireless networking signal has been received (111), e.g., by comparing digital samples to thresholds. If the power of a sample is greater than a threshold, then a signal is present (yes branch of 111). If a signal is present (yes branch of 111) and a gain state change is not invoked (no branch of 112), then power detector 44 causes demodulation components such as DVGA 46 and demodulation unit 48 to be enabled for peak detection (114). If peak detection is successful (yes branch of 114), indicating that a wireless networking packet was received, demodulation unit 48 demodulates the signal (105), and wireless device 10E returns to gain state 1 (101). If peak detection fails at this point (no branch of 114), complete demodulation of the signal is not performed. In other words, demodulation beyond a peak detection search is only performed if the peak detection is successful, i.e., indicating that the signal is not a jammer signal (yes branch of 114).

If a peak detection fails, indicating that a detected signal is a jammer signal (no branch of 114), the noise thresholds are updated in power detector 44 (115). By updating the noise thresholds, wireless device 10E can operate more effectively. In particular, the same jammer signal will not cause demodulation components to be enabled if the thresholds in power detector 44 are adjusted so that the power associated with the wireless signal is less than the threshold. As mentioned, this results in power conservation and reductions in computational overhead in wireless device 10E.

If in the current gain state (110) no signal is detected (no branch of 111) and the power level of a digital sample of the signal falls below a lower threshold (yes branch of 113), then wireless device reinitializes to gain state 1, and the process begins anew. In that case, a jammer signal that was present may have faded or expired. Thus, returning wireless device to the maximum sensitivity state of gain state one (101) in response to a digital sample of the signal falling below the lower threshold (yes branch of 113) can provide responsiveness to the elimination of jammer signals.

If wireless device detects a signal (111), but determines that another gain state change is needed (yes branch of 112), then the process of blocks 108-115 repeat in gain state 3, then possibly gain state 4, and so forth. An implementation with three possible gain states, however, may be sufficient for wireless networking applications.

Importantly, thresholds are updated (115), following detection of a jammer signal (no branch of 114). Thus, the same jammer signal will not cause demodulation components to be enabled because the threshold will be set such that the jammer signal is not above the threshold. Power detector 44 may define dynamic upper and lower thresholds, the upper threshold defining how much power is required to enable the demodulation components and the lower threshold defining when wireless device 10E should reset to gain state 1. Resetting wireless device 10E when the power of a sample of the received signal falls below the lower threshold can improve responsiveness to the disappearance of jammer signals, and e.g., even allow for relatively low power 802.11b packets to be received and demodulated between the occurrence of successive relatively high power Bluetooth packets, which would be jammer signals to a device that only supported 802.11b.

Figure 5:
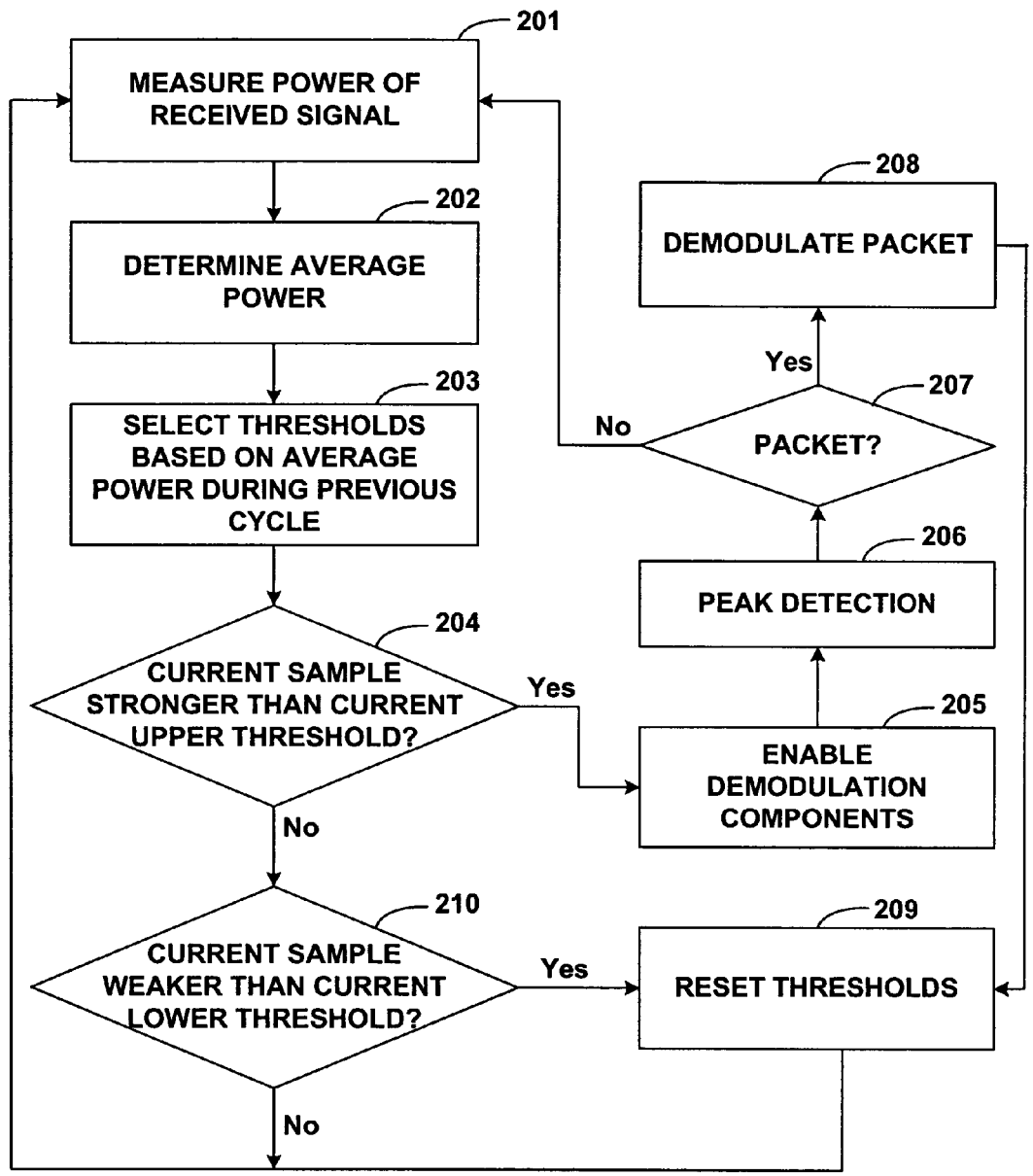

FIG. 5 is another flow diagram illustrating a signal processing technique that may be implemented by one or more of wireless devices 10 (FIG. 1) such as wireless device 10E (FIG. 2). In particular, FIG. 5 illustrates techniques for adjusting thresholds in a power detector in order to improve signal processing in the presence of jammer signals. In some embodiments, the technique of FIG. 5 may be implemented in a wireless device following selection of a desired gain state for processing a received signal.

As shown in, FIG. 5, power detector 44 measures the power of a received signal, such as by measuring the power of one or more digital samples of the signal (201). Power detector 44 also determines an average power of the received signal, such as by integrating over a sliding window of samples (202). In some cases, the average power may be selected to correspond to the power of a single sample until a selected number samples are available to calculate an average. Power detector 44 then selects thresholds based on the average power during the previous cycle (203). For example, threshold units 59, 69 of power detection modules 50, 60 may receive the average power measurements from integrators 56, 66, and generate upper and lower thresholds relative to the average power estimates. As mentioned, the individual values of received samples may be used as average values until a number of samples, e.g., four samples, have been received and integrated by integrators 56, 66. After four samples have been received, the average power may be defined by threshold units 59, 69 for a sliding window of four samples. Also, once integrators 56, 66 have received eight samples, threshold units 59, 69 may define the average power using a sliding window of eight samples, and so forth.

The upper and lower thresholds may also change such that the thresholds are closer to the average value when more samples are available. In other words, if one sample is used to define the thresholds, threshold units 59, 69 may define the thresholds as being +/−X of the sample. Once fours samples are available and used to define the thresholds, threshold units 59, 69 may define the thresholds as being +/−Y of the average, where Y is less than X. Similarly, once eight samples are available and used to define the thresholds, threshold units 59, 69 may define the thresholds as being +/−Z of the average, where Z is less than Y.

If a current digital sample is stronger than the current upper threshold (yes branch of 204), power detector 44 enables demodulation components (205) to determine whether the signal is a wireless networking packet to be demodulated, i.e., a packet supported by the protocol of wireless device 10E. To determine whether the signal is a wireless networking packet to be demodulated, demodulation unit 48 may perform a peak detection search algorithm on the signal as is well known in the art (206). For example, the process of performing a peak detection search may comprise applying a correlation function on the signal to determine if the signal has sufficient signal strength and follows a waveform that conforms to the protocol being used. In this manner, peak detection (206) can be used to determine whether a received signal corresponds to a packet to be demodulated. If so (yes branch of 207), wireless device demodulates the packet (208). Following demodulation of the packet (208), the thresholds of power detector 44 can be reset to a noise floor so that wireless device has maximum sensitivity (209).

If a current digital sample is not stronger than the current upper threshold (no branch of 204), and also not weaker than a current lower threshold (no branch of 210), then the process of steps 201-203 repeats for the next sample. In this manner, the thresholds continuously adjust relative to the average power of the received samples. The average power for a previous cycle is used to define the threshold for the next cycle.

Also, if following enablement of the demodulation components (205), the peak detection fails in step 206, indicating that the signal does not correspond to a wireless networking packet to be demodulated (no branch of 207), the process of steps 201-203 repeats for the next sample. In that case, the received signal that invoked enablement of the demodulation components was a jammer signal. Importantly, during the next cycle, the same jammer signal will likely not be stronger than the current upper threshold (no branch of 204) because the thresholds are defined based on the average power of the previous cycle. Since the jammer signal was present during the previous cycle, its signal strength will increase the average signal strength, and thus increase the thresholds during the subsequent cycle, making it unlikely that a sample corresponding to the same jammer signal will be stronger than the current threshold (204) in that subsequent cycle. Thus, the same jammer signal will likely not cause demodulation components to be enabled (205) in the subsequent cycles. Such a processing technique can therefore improve signal processing in the presence of jammer signals, as commonly encountered in the unregulated frequency bands associated with wireless networking protocols.

If a current sample is weaker than a current lower threshold (yes branch of 210), the thresholds are reset (209) prior to repeating the process. In that case, if a jammer signal was present, but then disappeared, resetting the thresholds (209) allows wireless device 10E to be responsive to such occurrences. Resetting the thresholds (209) when the power of a sample of the received signal falls below the lower threshold (yes branch of 210), e.g., can allow for relatively low power 802.11b packets to be received and demodulated between the occurrence of successive relatively high power Bluetooth packets, which would be jammer signals to a device that only supported 802.11b.

Various techniques for processing wireless packets have been described as being implemented in hardware. Example hardware implementations of modem 26 or similar control units may include implementations within a DSP, an application specific integrated circuit (ASIC), a field programmable gate array (FPGA), a programmable logic device, specifically designed hardware components, or any combination thereof. In addition, one or more of the techniques described herein may be partially or wholly executed in software. In that case, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. Also, various other modifications may be made without departing from the spirit and scope of the invention. Accordingly, these and other embodiments are within the scope of the following claims.

The invention claimed is:

1. A method comprising:
   receiving a wireless signal, wherein the wireless signal is a correlatable signal;
   determining if a measured power for the wireless signal is greater than a threshold;
   when the measured power is greater than the threshold, processing the wireless signal in accordance with a wireless networking protocol to be demodulated to determine whether the wireless signal corresponds to a packet for the wireless networking protocol to be demodulated; and
   when the processed and correlatable wireless signal does not correspond to a packet for the wireless networking protocol to be demodulated, adjusting the threshold so that the measured power for the wireless signal is less than the threshold to avoid subsequent detection of the wireless signal.

2. The method of claim 1, wherein the adjusting the threshold comprises
   determining an average power of the wireless signal, and
   adjusting the threshold based on the average power of the wireless signal.

3. The method of claim 2, wherein the adjusting the threshold further comprises
   adjusting the threshold further based on the number of digital samples used to derive the average power of the wireless signal.

4. The method of claim 1, further comprising:
   demodulating the wireless signal if the wireless signal corresponds to a packet for the wireless networking protocol to be demodulated.

5. The method of claim 2, further comprising:
   resetting the threshold following successful demodulation of the wireless signal.

6. The method of claim 1, further comprising:
   declaring the wireless signal as a jammer signal if the measured power is greater than the threshold and the wireless signal does not correspond to a packet for the wireless networking protocol to be demodulated.

7. The method of claim 2, further comprising:
   continuously adjusting the threshold relative to the average power of the wireless signal.

8. The method of claim 1, wherein the threshold is an upper threshold, the method further comprising:
   adjusting the upper threshold and a lower threshold relative to an average power of the wireless signal;
   using the upper threshold to determine whether the wireless signal is a jammer signal; and
   using the lower threshold to determine whether the jammer signal has vanished.

9. The method of claim 8, further comprising:
   resetting the upper and lower thresholds when the measured power for the wireless signal is less than the lower threshold.

10. The method of claim 1, wherein the processing the wireless signal in accordance with the wireless networking protocol to be demodulated includes performing correlation between the wireless signal and a known sequence for the wireless networking protocol to be demodulated.

11. The method of claim 1, further comprising:
processing the wireless signal in one of a plurality of gain states.

12. A method comprising:
receiving a wireless signal, wherein the wireless signal is a correlatable signal;
processing the wireless signal in one of a plurality of gain states;
determining if a measured power for the wireless signal is greater than a threshold;
when the measured power is greater than the threshold, processing the wireless signal in accordance with a wireless networking protocol to be demodulated to determine whether the wireless signal corresponds to the wireless networking packet to be demodulated;
when the processed and correlatable wireless signal does not correspond to the wireless networking packet to be demodulated, adjusting the threshold so that the measured power for the wireless signal is less than the threshold to avoid subsequent detection of the wireless signal; and
disabling adjustment of the threshold in at least one of the plurality of gain states.

13. A method comprising:
receiving a wireless signal, wherein the wireless signal is a correlatable signal;
processing the wireless signal in one of a plurality of gain states;
measuring an average power level of the wireless signal;
defining upper and lower thresholds relative to the average power level;
determining if a measured power for the wireless signal exceeds the upper threshold;
when the measured power exceeds the upper threshold, processing the wireless signal in accordance with a wireless networking protocol to be demodulated to determine whether the wireless signal is for a packet for the wireless networking protocol to be demodulated; and
when the processed and correlatable wireless signal is not for a packet for the wireless networking protocol to be demodulated, adjusting the upper threshold so that the measured power for the wireless signal is less than the upper threshold to avoid subsequent detection of the wireless signal.

14. The method of claim 13, further comprising:
resetting the upper and lower thresholds when the measured power for the wireless signal is less than the lower threshold.

15. The method of claim 13, wherein the measuring the average power level comprises measuring the average power level based on a sliding window of digital samples for the wireless signal, and wherein the defining the upper and lower thresholds comprises continuously defining the upper and lower thresholds about the average power level.

16. A wireless device comprising:
a receiver that receives a wireless signal, wherein the wireless signal is a correlatable signal; and
a control unit that determines if a measured power for the wireless signal is greater than a threshold, processes the wireless signal in accordance with a wireless networking protocol to be demodulated when the measured power is greater than the threshold to determine whether the wireless signal corresponds to the packet for a wireless networking protocol to be demodulated, and adjusts the threshold when the processed and correlatable wireless signal does not correspond to a packet for the wireless networking protocol to be demodulated so that the measured power for the wireless signal is less than the threshold to avoid subsequent detection of the wireless signal.

17. The wireless device of claim 16, wherein the control unit determines an average power of the wireless signal and adjusts the threshold based on the average power of the wireless signal.

18. The wireless device of claim 17, wherein the control unit adjusts the threshold further based on the number of digital samples used to derive the average power of the wireless signal.

19. The wireless device of claim 16, wherein the control unit demodulates the wireless signal if the wireless signal corresponds to a packet for the wireless networking protocol to be demodulated.

* * * * *